United States Patent [19]

Lehnhoff et al.

[11] Patent Number: 4,710,685
[45] Date of Patent: Dec. 1, 1987

[54] VEHICLE POWER WINDOW CONTROL CIRCUIT WITH REVERSE BATTERY PROTECTION

[75] Inventors: Richard N. Lehnhoff; Robert J. Disser, both of Dayton, Ohio

[73] Assignee: General Motors Corporation, Detroit, Mich.

[21] Appl. No.: 15,321

[22] Filed: Feb. 17, 1987

[51] Int. Cl.$^4$ .......................... H02P 1/22; H02H 7/08
[52] U.S. Cl. .................................... 318/287; 318/286; 318/293; 318/434
[58] Field of Search ............... 318/280, 286, 287, 288, 318/289, 291, 293, 345 C, 345 G, 434; 361/23, 24

[56] References Cited

U.S. PATENT DOCUMENTS

| | | | |
|---|---|---|---|
| 4,476,416 | 10/1984 | Licata et al. | 318/286 X |
| 4,496,886 | 1/1985 | Gordon et al. | 318/332 X |
| 4,562,387 | 12/1985 | Lehnhoff | 318/286 X |
| 4,575,662 | 3/1986 | Lehnhoff . | |

Primary Examiner—Bentsu Ro
Attorney, Agent, or Firm—Robert M. Sigler

[57] ABSTRACT

A power window control circuit for a motor vehicle includes a FET and SCR in series across the power supply with their junction connected to one side of a motor armature, the other side of the motor armature being switchable between power supply terminals. To provide reverse battery protection, no anti-parallel diode is provided around the SCR. The activation circuit for the FET includes a capacitor bootstrap circuit controlled by a switching transistor and a zener diode from the drain to the gate. When conduction from the switch through the motor and SCR is stopped, the inductive energy from the armature windings dissipates through the internal anti-parallel diode of the FET. When opposite conduction from the FET through the motor and switch is stopped, the inductive energy causes the voltage across the FET to rise to the zener voltage and turn on the FET sufficiently to dissipate it.

3 Claims, 1 Drawing Figure

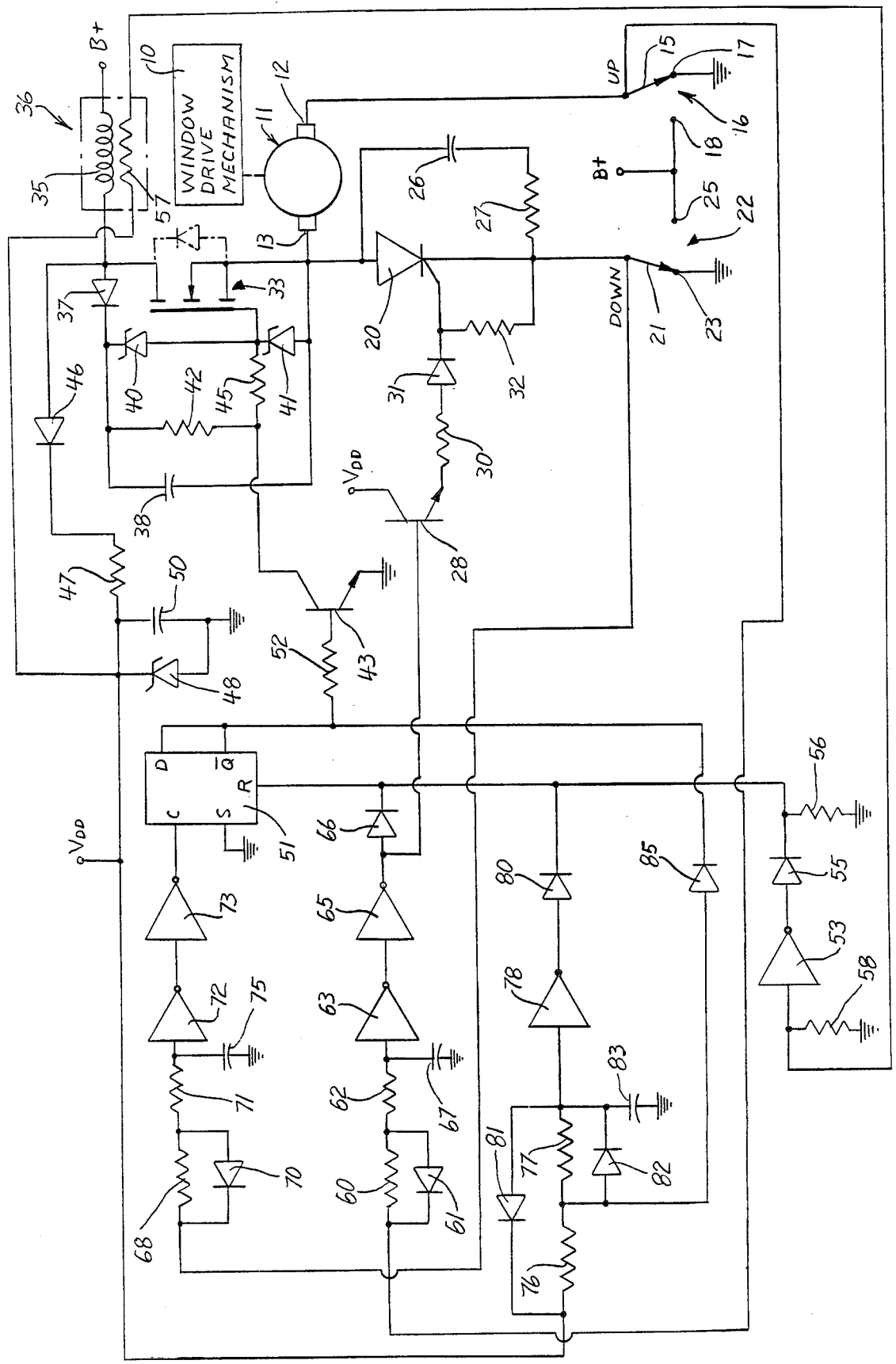

4,710,685

VEHICLE POWER WINDOW CONTROL CIRCUIT WITH REVERSE BATTERY PROTECTION

BACKGROUND OF THE INVENTION

This invention relates to a control circuit for an electric motor driven vehicle window. Such a circuit includes switches for controlling the application of electric current to the motor armature in a first or second direction to open or close the window; and these switches are often semiconductor switches such as FETs.

However, the motor armature is inductive and, in operation, stores inductive energy which must be dissipated when the motor is switched off so that it does not harm the semiconductor switches. This is normally accomplished by providing anti-parallel diodes around the semiconductor switches. An anti-parallel diode is a diode in parallel with a device and poled so as to allow current flow in the opposite direction to the normal current flow of the device. FETs inherently contain internal anti-parallel diodes, but such diodes are added in circuit with SCRs and other semiconductor switches. These diodes are often called free-wheeling diodes. An example may be seen in the U.S. patent to Lehnhoff U.S. Pat. No. 4,575,662, issued Mar. 11, 1986. The SCRs of that patent have anti-parallel diodes added, while the FETs have such devices inherently.

Anti-parallel diodes, however, may create a problem if the main power supply is connected with the wrong polarity. In a vehicle, if the battery is removed and reinstalled backwards, the anti-parallel diodes may create a short across the battery, which may lead to damage, in the case of FETs, to the FETs of which they are part. Thus, a power window control circuit with reverse battery protection should include some switching device in each possible reverse current path having no such anti-parallel diode. This is not possible with FETs, since the anti-parallel diodes are internal and inherent in the devices themselves. If FETs and SCRs are combined in a switching arrangement, the latter may be provided without anti-parallel diodes. Such an arrangement, however, must provide alternative means for dissipating the inductive energy of the motor armature windings when the switches are opened and the conducting path is broken.

SUMMARY OF THE INVENTION

In brief summary, the invention relates to a power window control circuit for a motor vehicle in which the motor switching circuit includes, from one side of the motor armature, a FET connected to one power supply terminal and a first switch connected to the other power supply terminal. The first switch may be an SCR; it is normally open and has no anti-parallel diode. The other side of the motor armature is connectible by a second switch to one terminal or the other of the power supply.

A capacitor is connected across the FET with unidirectional current means in series so that the capacitor charges up from the power supply. A third switch connecting the gate of the FET to the power supply normally controls conduction of the FET. A resistor connects the capacitor to the FET gate to form a bootstrap circuit to turn on the FET with one state of the third switch and turn it off with the other state. Control means activate the switches to create current flows through the motor armature in each direction and thus open and close the window. When the current in one direction stops, the anti-parallel diode of the FET dissipates the inductive energy of the motor armature windings. When the current in the other direction stops, the voltage across the FET increases far above normal power supply voltage. To protect the FET, a zener diode is connected across its drain to gate. If the voltage across the FET exceeds the zener voltage plus the threshold voltage of the FET, the FET conducts, regardless of the state of the third switch, sufficiently to dissipate the inductive energy of the motor armature windings. Thus, reverse battery protection and FET protection from inductive switching are both provided in a circuit with a reversing motor. Further details and advantages will be apparent from the accompanying drawing and following description of a preferred embodiment.

BRIEF DESCRIPTION OF THE DRAWING

FIG. 1 shows a circuit of the present invention for controlling a power window.

DESCRIPTION OF THE PREFERRED EMBODIMENT

A window drive mechanism 10 of the standard type is reversibly drivable for up or down window movement by a reversible, DC, permanent magnet motor 11 having an armature circuit with terminals 12, 13 as shown in the FIGURE. Terminal 12 is connected to the movable armature 15 of up switch 16, armature 15 being biased against a normally closed grounded contact 17 and activatable, only as long as the activating force is applied, into contact with normally open contact 18 connected to an electrical power supply B+ at a predetermined voltage relative to ground. Power supply B+ may be the normal 12-14 volt vehicle battery, alternator and voltage regulator system, which is not shown.

Terminal 13 of motor 11 is connected to the anode of an SCR 20 (2N6397) having a cathode connected to the movable armature 21 of down switch 22, armature 21 being biased against a normally closed grounded contact 23 and activatable, only as long as the activating force is applied, into contact with normally open contact 25 connected to electrical power supply B+. Switches 16 and 22 may be combined with a single rocker actuator activatable in opposite directions from a normal center position in the familiar power window operating switch arrangement or may use separate actuating mechanisms. A capacitor 26 (0.1 uF) in series with a resistor 27 (10) are placed in parallel with SCR 20 to provide dv/dt protection therefore. SCR 20 may be turned on by an NPN transistor 28 (2N3904) having a collector connected to a power supply $V_{DD}$ and an emitter connected through a resistor 30 (100) and series diode 31 to the gate of SCR 20, the gate of SCR 20 also being connected through a resistor 32 (1K) to armature 21 of switch 22. If transistor 28 is turned on by a high voltage on its base, SCR 20 will be activated to conduct in the normal SCR manner.

Terminal 13 of motor 11 is also connected to the source of a FET 33 having a drain connected through a heating coil 35 of a stall current sensor 36 to power supply B+. The drain of FET 33 is also connected through a diode 37 and capacitor 38 (10 uF) to the source thereof. A zener diode 40 (40 v) and zener diode 41 (12 v) in series are connected between the cathode of diode 37 and the source of FET 33, with zener diode 40 having its cathode connected to the cathode of diode 37. A resistor 42 (2.2K) is connected from the cathode of diode 37 to the collector of an NPN transistor 43 having a grounded emitter. The collector of transistor 43 is further connected through a resistor 45 (100) to the junction of the anode of zener diode 40 and the cathode of zener diode 41, which junction is also connected to the gate of FET 33. Capacitor 38 with resistors 42 and 45 comprise a bootstrap turnon circuit for FET 33 activated by the turnoff of transistor 43. Zener diode 41 protects FET 33 by limiting its source to gate voltage to 12 volts. The purpose of zener diode 40 will be described at a later, more appropriate point.

A local power suppl $V_{DD}$, already mentioned, is provided by a diode 46 having an anode connected through coil 35 to power supply B+ and a cathode connected through a resistor 47 (220) to a terminal labeled $V_{DD}$, which terminal has a zener diode 48 (12 v) and capacitor 50 (22 uF) connected therefrom in parallel to ground. The terminal labeled $V_{DD}$ is understood to be connected to any other point in the circuit so labeled or as power supply for integrated circuit chips such as inverters or flip-flops.

A flip-flop 51 has a grounded S input, a NOT Q output connected to a D input and through a resistor 52 (10K) to the base of transistor 43, and an R input connected through a resistor 56 (10K) to ground. Flip-flop 51 is thus connected to control the state of transistor 43 and thus, normally, the state of FET 33. Terminal $V_{DD}$ is connected in series through a resistor 57, an inverter 53 and a diode 55 to the R input of flip-flop 51, with the junction of resistor 57 and inverter 53 being connected through a resistor 58 to ground. Resistor 57 is physically part of stall current sensor 36 and in thermal contact with heating coil 35 therein. Its resistance varies with its temperature and therefore with the motor armature current flowing through heating coil 35 and is furthermore a portion of a voltage divider formed with resistor 58 to reset flip-flop 51 when motor 11 is stalled.

Armature 15 of up switch 16 is connected to the R input of flip-flop 51 through a debouncing circuit comprising the parallel combination of a resistor 60 (100K) and a diode 61 in series with a resistor 62 (100K), an inverter 63, another inverter 65 and a diode 66, with a capacitor 67 (0.22 uF) connected to ground from the input of inverter 63. Diode 61 has its cathode connected to armature 15. The output of inverter 65 is further connected to the base of transistor 28 to control the activation of SCR 20. Flip-flop 51 is thus reset by the activation of up switch 16.

Armature 21 of down switch 22 is connected to the C input of flip-flop 51 through a debouncing circuit comprising the parallel combination of a resistor 68 (100K) and a diode 70 in series with a resistor 71 (100K), an inverter 72 and another inverter 73, with a capacitor 75 (0.22 uF) connected to ground from the input of inverter 72. Diode 70 has its cathode connected to armature 21. Flip-flop 51 is thus toggled between its set and reset states by the activation of down switch 22, due to the feedback from the NOT Q output to the D input.

A power up initializing circuit connects terminal $V_{DD}$ through series resistors 76 (10K) and 77 (1 M), an inverter 78 and a diode 80 to the R input of flip-flop 51, resistors 76 and 77 being spanned by a diode 81 with its cathode connected to $V_{DD}$, resistor 77 being spanned by a diode 82 and the input of inverter 78 being connected through a capacitor 83 (10 uF). The junction of resistors 76 and 77, also connected to the anode of diode 82, is connected through a diode 85 to the D input of flip-flop 51. One of the functions of this circuit is to initially reset flip-flop 51 at power up and then, when capacitor 83 becomes charged, to release control of flip-flop 51 to the rest of the circuit. Others will be described below, in connection with the description of the operation of the circuit.

In operation, initial power up charges capacitor 38 of the bootstrap circuit to B+ and capacitor 50 of the regulated power supply to 12 volts, regulated by zener diode 48. In addition, as described above, it maintains flip-flop 51 in a reset condition while the rest of the circuit is coming up to full operation. This ensures that FET 33 will not be inadvertently turned on to initiate current through motor 11 and switch 16 with consequent downward window movement during the initialization process. Initialization ends with capacitor 83 charged up to $V_{DD}$, transistor 28 off, transistor 43 on, FET 33 off and flip-flop 51 still reset but with a low R input.

To initiate downward window movement, an operator activates down switch 22. This toggles flip-flop 51 to its set state, with a low NOT Q output. Thus, transistor 43 turns off; and capacitor 38 sends the gate of FET 33 high to turn it on. Transistor 28 is still held off by the ground state of up switch 16, so a current path is established from B+ through heating coil 35 of stall current sensor 36, FET 33, motor 11 and switch 16 to drive motor 11 in the window lowering (opening) direction. Switch 22 need not be held after the motor driving circuit is established, since flip-flop 51 maintains its low NOT Q output. If no further inputs are given to the system, the window will be driven down to its full open position, whereupon the sensed stall current will change the resistance of resistor 57 and cause flip-flop 51 to be reset through inverter 53 and the R input, thus turning off FET 33 and motor 11.

Once downward movement of the window is started and switch 22 released, however, the downward movement may be stopped by another activation of switch 22, which causes flip-flop 51 to be toggled to its reset state through inverter 73 and the C input. Downward movement may also be stopped by activation of switch 16, which resets flip-flop 51 through inverter 65 and the R input. Activation of this switch for any significant time will not only stop downward movement but also initiate upward movement. However, as will be seen below, such upward movement stops as soon as switch 16 is released; therefore a momentary activation will not cause appreciable upward movement.

When downward movement of the window is initiated by the NOT Q output of flip-flop 51 going low, capacitor 83 starts to discharge through resistor 77. If a malfunction should occur which unloads the motor, so that no stall current is sensed and the motor keeps running, capacitor 83 will discharge sufficiently to reset flip-flop 51 through inverter 78 after about 10 seconds. Thus there is a predetermined time limit to the automatic operation of motor 11. Capacitor 83 is much more quickly recharged through the smaller resistor 76 when flip-flop 51 is reset.

It should be noted that, while FET 33 is turned on and the window is moving downward, capacitor 38, which supplies the voltage to keep FET 33 turned on, is discharging. However, the discharge current is very small, so that FET 33 will stay turned on through any normal window opening operation.

Activation of up switch 16 resets flip-flop 51 to turn on transistor 43 and thus turn off FET 33. It also turns on transistor 28 to trigger SCR 20 into conducting condition and closes a circuit from B+ through switch 16, motor 11, SCR 20 and switch 22 to run motor 11 in the window closing direction and drive the window upward. This movement will continue only as long as switch 16 is held closed, since the motor armature circuit includes the switch itself.

The preceding describes normal operation of the circuit, which is presumed to be correctly installed in a vehicle relative to the vehicle battery. However, suppose that the vehicle owner or a service person takes out the battery and reinstalls it backward. In this case the shown ground connections would become +12 to +14 volts relative to B+. FET 33 inherently includes an internal anti-parallel diode, illustrated by the dashed line diode connecting its source and drain. The circuit of this invention protects FET 33 from damage or destruction with reverse battery connection by not including an anti-parallel diode around SCR 20. Such a diode, if provided, would create a short through itself and the internal diode of FET 33 across the battery; but no such short is created in this circuit. Rather, as soon as the reverse battery connection is made, a circuit is established through switch 16, motor 11, the internal diode of FET 33 and heating coil 35. The armature of motor 11 will limit current to normal levels; and the unexpected window opening will alert the operator or service person that something is wrong.

However, without an anti-parallel diode around SCR 20, something must be done in normal operation to dissipate the inductive energy of the armature windings of motor 11 when switch 22, having been closed, is opened. In this circuit this is handled by zener diode 40 and FET 33. When switch 22 opens, the change in current through the inductive armature of motor 11 causes the voltage at terminal 13 to spike downward below ground, since the voltage at terminal 12 is fixed at ground by switch 16. In the absence of zener diode 40, this would cause the voltage across FET 33 to increase above the maximum allowable source to drain voltage of the FET. However, as soon as it reaches the 40 volt level of zener diode 40, the gate to drain voltage of FET 33 becomes limited and the source to gate voltage of FET 33 starts increasing. With a few more volts increase, the threshold voltage of FET 33 is reached and FET 33 turns on briefly to allow current flow therethrough and dissipate the inductive energy of the motor armature windings. The source to drain voltage of FET 33 does not go appreciably higher than the sum of the zener breakdown voltage of zener diode 40 and the threshold voltage of FET 33. As soon as the energy is sufficiently dissipated to allow the voltage across FET 33 to decrease below the sum of the zener voltage and threshold voltage, FET 33 turns off, since transistor 43 is still on. Thus, the inductive energy of the motor armature windings is dissipated during switching by the circuit of this invention while it is protected from power supply reversal.

The embodiments of the invention in which an exclusive property or privilege is claimed are defined as follows:

1. A power window control circuit for a motor vehicle comprising, in combination:
    an electric power supply having first and second terminals with a first predetermined voltage therebetween;
    an electric motor having an armature with first and second armature terminals;
    a FET having drain and source connected between the first armature terminal of the electric motor and the first terminal of the electric power supply, the FET further having a gate and an internal anti-parallel diode;
    a first switch connecting the first armature terminal of the electric motor to the second terminal of the electric power supply, the first switch being normally open;
    a second switch having first and second states connecting the second armature terminal of the electric motor to the first and second terminals, respectively, of the electric power supply, the second switch being normally in its second state;
    a capacitor connected across the drain and source of the FET;
    unidirectional current means in series with the capacitor and effective to allow the capacitor to be charged by the electrical power supply but prevent the capacitor from discharging through the FET;
    a third switch connecting the gate of the FET to the second terminal of the electric power supply;
    resistance means connecting the side of the capacitor adjacent the first terminal of the electric power supply to the gate of the FET;
    first control means activatable to change the second switch to its first state and close the first switch, whereby the motor is activated to run in a first window moving direction, and deactivatable to return the second switch to its second state and open the first switch, whereby the motor stops running and the inductive energy of the motor armature is dissipated through the internal anti-parallel diode of the FET;
    second control means activatable to open the third switch and thus allow the FET to conduct, whereby the motor is activated to run in a second window moving direction, and deactivatable to close the third switch, whereby the FET stops conducting and the motor stops running;
    a zener diode connected to limit the voltage from gate to drain of the FET to a second predetermined voltage greater than the first but less than that which will harm the FET, whereby the increase in voltage across the FET caused by the inductive energy in the armature windings of the motor upon deactivation of the second control means causes the FET to conduct as necessary to dissipate said inductive energy without harm to the FET.

2. The power window control circuit of claim 1 in which the first switch is an SCR having no anti-parallel diode.

3. A power window control circuit for a motor vehicle comprising, in combination:
    an electric power supply having power and ground terminals with a power supply voltage therebetween;
    an electric motor having an armature with first and second armature terminals;
    a FET having a drain connected to the power terminal and a source connected to the first armature terminal, the FET further having a gate and an internal anti-parallel diode;
    an SCR connecting the first armature terminal to the ground terminal of the electric power supply;
    a switch having first and second states connecting the second armature terminal to the power and ground terminals, respectively, the switch being normally in its second state;

a first diode having an anode connected to the FET drain and a cathode;

a capacitor connected from the cathode of the first diode to the FET source;

first and second resistors in series connected between the cathode of the first diode and the FET gate;

a transistor having a control electrode and further having an internal controlled current path connecting the junction of the first and second resistors to the ground terminal;

a first zener diode having a cathode connected to the cathode of the first diode and an anode connected to the FET gate, the first zener diode having a zener voltage greater than the power supply voltage but less, by at least the FET threshold voltage, than the maximum allowable FET source to drain voltage;

a second zener diode having a cathode connected to the FET gate, an anode connected to the FET source and a zener voltage less than the maximum allowable FET source to gate voltage;

first control means activatable to activate the SCR and change the switch to its first state, whereby the motor is activated to run in a first window moving direction, and deactivatable to return the switch to its second state, whereby the motor stops running, the SCR deactivates and the inductive energy of the motor armature is dissipated through the internal anti-parallel diode of the FET; and second control means connected to the transistor control electrode to cause conduction through the transistor and thus ground the FET gate, the second control means being activatable to end conduction through the transistor and thus allow the capacitor to activate the FET to conduct, whereby the motor is activated to run in a second window moving direction, and deactivatable to resume conduction through the transistor, whereby the FET stops conducting, the motor stops running, and the inductive energy of the motor armature is dissipated by the FET conducting due to the high voltage generated thereby across the FET and the first zener diode.

* * * * *